US007011811B2

(12) United States Patent
Elomari

(10) Patent No.: US 7,011,811 B2
(45) Date of Patent: *Mar. 14, 2006

(54) MOLECULAR SIEVE SSZ-65 COMPOSITION OF MATTER AND SYNTHESIS THEREOF

(75) Inventor: Saleh Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 10/956,267

(22) Filed: Sep. 30, 2004

(65) Prior Publication Data

US 2005/0042169 A1    Feb. 24, 2005

Related U.S. Application Data

(63) Continuation-in-part of application No. 10/401,632, filed on Mar. 26, 2003, now abandoned.

(51) Int. Cl.
*C01B 39/48* (2006.01)
(52) U.S. Cl. ...................................... 423/718; 423/706
(58) Field of Classification Search ............... 423/706, 423/718
See application file for complete search history.

(56) References Cited

U.S. PATENT DOCUMENTS

| | | | |
|---|---|---|---|
| 3,140,249 A | 7/1964 | Plank et al. | |
| 3,140,251 A | 7/1964 | Plank et al. | |
| 3,140,253 A | 7/1964 | Plank et al. | |
| 4,297,328 A | 10/1981 | Ritscher et al. | |
| 4,559,315 A | 12/1985 | Chang et al. | |
| 4,910,006 A | 3/1990 | Zones et al. | |
| 5,225,179 A | 7/1993 | Zones et al. | |
| 5,316,753 A | 5/1994 | Nakagawa | |
| 6,464,956 B1 * | 10/2002 | Elomari | 423/706 |
| 6,616,911 B1 | 9/2003 | Elomari | |
| 6,632,417 B1 * | 10/2003 | Elomari | 423/706 |
| 6,733,742 B1 | 5/2004 | Elomari | |
| 6,776,973 B1 | 8/2004 | Elomari | |
| 2003/0180217 A1 * | 9/2003 | Canos et al. | 423/718 |
| 2004/0191167 A1 | 9/2004 | Elomari | |

OTHER PUBLICATIONS

Christopher W. Jones et al., Synthesis of Hydrophobic Molecular Sieves by Hydrothermal Treatment with Acetic Acid, 2001 American Chemical Society, Chem Matter, 2001, 1041-1050, 3, Division of Chemistry and Chemical Engineering, California Institute of Technology, Pasadena, California.

Akira Saito et al., Argon porosimetry of selected molecular sieves: experiments and examination of the adapted Horvath-Kawazoe model, Microporous Materials, 1995, 531-542, 3, Elsevier Science B.V.

B.C. Lippens et al., Studies on Pore Systems in Catalysts V. the t method, Journal of Catalysis, 1965, 319-323, 4, From the Department of Chemcial Technology, Technological University of Delft, The Netherlands.

* cited by examiner

*Primary Examiner*—David Sample
(74) *Attorney, Agent, or Firm*—Richard J. Sheridan

(57) ABSTRACT

The present invention relates to new crystalline molecular sieve SSZ-65 prepared using 1-[1-(4-chlorophenyl)-cyclopropylmethyl]-1-ethyl-pyrrolidinium or 1-ethyl-1-(1-phenyl-cyclopropylmethyl)-pyrrolidinium cation as a structure-directing agent, methods for synthesizing SSZ-65 and processes employing SSZ-65 in a catalyst.

22 Claims, No Drawings

MOLECULAR SIEVE SSZ-65 COMPOSITION OF MATTER AND SYNTHESIS THEREOF

This application is a continuation-in-part of application Ser. No. 10/401,632, filed Mar. 26, 2003 now abandoned.

BACKGROUND OF THE INVENTION

1. Field of the Invention

The present invention relates to new crystalline molecular sieve SSZ-65, a method for preparing SSZ-65 using a 1-[1-(4-chlorophenyl)-cyclopropylmethyl]-1-ethyl-pyrrolidinium or 1-ethyl-1-(1-phenyl-cyclopropylmethyl)-pyrrolidinium cation as a structure directing agent and the use of SSZ-65 in catalysts for, e.g., hydrocarbon conversion reactions.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SUMMARY OF THE INVENTION

The present invention is directed to a family of crystalline molecular sieves with unique properties, referred to herein as "molecular sieve SSZ-65" or simply "SSZ-65". Preferably, SSZ-65 is obtained in its silicate, aluminosilicate, titanosilicate, germanosilicate, vanadosilicate or borosilicate form. The term "silicate" refers to a molecular sieve having a high mole ratio of silicon oxide relative to aluminum oxide, preferably a mole ratio greater than 100, including molecular sieves comprised entirely of silicon oxide. As used herein, the term "aluminosilicate" refers to a molecular sieve containing both aluminum oxide and silicon oxide and the term "borosilicate" refers to a molecular sieve containing oxides of both boron and silicon.

In accordance with this invention, there is provided a molecular sieve having a mole ratio greater than about 15 of (1) an oxide of a first tetravalent element to (2) an oxide of a trivalent element, pentavalent element, second tetravalent element different from said first tetravalent element or mixture thereof and having, after calcination, the X-ray diffraction lines of Table II.

Further, in accordance with this invention, there is provided a molecular sieve having a mole ratio greater than about 15 of (1) an oxide selected from silicon oxide, germanium oxide and mixtures thereof to (2) an oxide selected from aluminum oxide, gallium oxide, iron oxide, boron oxide, titanium oxide, indium oxide, vanadium oxide and mixtures thereof and having, after calcination, the X-ray diffraction lines of Table II below. It should be noted that the mole ratio of the first oxide or mixture of first oxides to the second oxide can be infinity, i.e., there is no second oxide in the molecular sieve. In these cases, the molecular sieve is an all-silica molecular sieve or a germanosilicate.

The present invention further provides such a molecular sieve having a composition, as synthesized and in the anhydrous state, in terms of mole ratios as follows:

| | |
|---|---|
| $YO_2/W_cO_d$ | 15–∞ |
| $M_{2/n}/YO_2$ | 0.01–0.03 |
| $Q/YO_2$ | 0.02–0.05 | wherein Y is silicon, germanium or a mixture thereof; W is aluminum, gallium, iron, boron, titanium, indium, vanadium or mixtures thereof; c is 1 or 2; d is 2 when c is 1 (i.e., W is tetravalent) or d is 3 or 5 when c is 2 (i.e., d is 3 when W is trivalent or 5 when W is pentavalent); M is an alkali metal cation, alkaline earth metal cation or mixtures thereof; n is the valence of M (i.e., 1 or 2); and Q is a 1-[1-(4-chlorophenyl)-cyclopropylmethyl]-1-ethyl-pyrrolidinium or 1-ethyl-1-(1-phenyl-cycloproylmethyl)-pyrrolidinium cation.

In accordance with this invention, there is also provided a molecular sieve prepared by thermally treating a zeolite having a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 15 at a temperature of from about 200° C. to about 800° C., the thus-prepared zeolite having the X-ray diffraction lines of Table II. The present invention also includes this thus-prepared molecular sieve which is predominantly in the hydrogen form, which hydrogen form is prepared by ion exchanging with an acid or with a solution of an ammonium salt followed by a second calcination. If the zeolite is synthesized with a high enough ratio of SDA cation to sodium ion, calcination alone may be sufficient. For high catalytic activity, the SSZ-65 zeolite should be predominantly in its hydrogen ion form. It is preferred that, after calcination, at least 80% of the cation sites are occupied by hydrogen ions and/or rare earth ions. As used herein, "predominantly in the hydrogen form" means that, after calcination, at least 80% of the cation sites are occupied by hydrogen ions and/or rare earth ions.

Also provided in accordance with the present invention is a method of preparing a crystalline material comprising (1) an oxide of a first tetravalent element and (2) an oxide of a trivalent element, pentavalent element, second tetravalent element which is different from said first tetravalent element, or mixture thereof and having a mole ratio of the first oxide to the second oxide greater than 15, said method comprising contacting under crystallization conditions sources of said oxides and a structure directing agent comprising a 1-[1-(4-chlorophenyl)-cyclopropylmethyl]-1-ethyl-pyrrolidinium or 1-ethyl-1-(1-phenyl-cyclopropylnethyl)-pyrrolidinium cation.

DETAILED DESCRIPTION OF THE INVENTION

The present invention comprises a family of crystalline, large pore molecular sieves designated herein "molecular sieve SSZ-65" or simply "SSZ-65". As used herein, the term "large pore" means having an average pore size diameter greater than about 6.0 Angstroms, preferably from about 6.5 Angstroms to about 7.5 Angstroms.

In preparing SSZ-65, a 1-[1-(4-chlorophenyl)-cyclopropylmethyl]-1-ethyl-pyrrolidinium or 1-ethyl-1-(1-phenylcyclopropylmethyl)-pyrrolidinium cation is used as a structure directing agent ("SDA"), also known as a crystallization template. The SDA's useful for making SSZ-65 have the following structures:

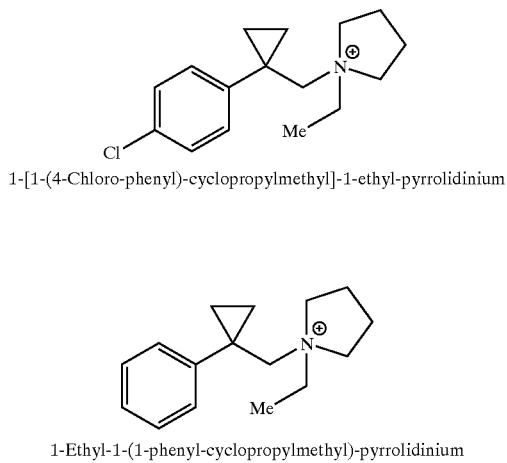

1-[1-(4-Chloro-phenyl)-cyclopropylmethyl]-1-ethyl-pyrrolidinium

1-Ethyl-1-(1-phenyl-cyclopropylmethyl)-pyrrolidinium

The SDA cation is associated with an anion ($X^-$) which may be any anion that is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

In general, SSZ-65 is prepared by contacting an active source of one or more oxides selected from the group consisting of monovalent element oxides, divalent element oxides, trivalent element oxides, tetravalent element oxides and/or pentavalent elements with the 1-[1-(4-chlorophenyl)-cyclopropylmethyl]-1-ethyl-pyrrolidinium or 1-ethyl-1-(1-phenyl-cyclopropylmethyl)-pyrrolidinium cation SDA.

SSZ-65 is prepared from a reaction mixture having the composition shown in Table A below.

TABLE A

| | Reaction Mixture | |
|---|---|---|
| | Typical | Preferred |
| $YO_2/W_aO_b$ | >15 | 30–70 |
| $OH^-/YO_2$ | 0.10–0.50 | 0.20–0.30 |
| $Q/YO_2$ | 0.05–0.50 | 0.10–0.20 |
| $M_{2/n}/YO_2$ | 0.02–0.40 | 0.10–0.25 |
| $H_2O/YO_2$ | 30–80 | 35–45 | where Y, W, Q, M and n are as defined above, and a is 1 or 2, and b is 2 when a is 1 (i.e., W is tetravalent) and b is 3 when a is 2 (i.e., W is trivalent).

In practice, SSZ-65 is prepared by a process comprising:
(a) preparing an aqueous solution containing sources of at least one oxide capable of forming a crystalline molecular sieve and a 1-[1-(4-chlorophenyl)-cyclopropylmethyl]-1-ethyl-pyrrolidinium or 1-ethyl-1-(1-phenyl-cyclopropylmethyl)-pyrrolidinium cation having an anionic counterion which is not detrimental to the formation of SSZ-65;
(b) maintaining the aqueous solution under conditions sufficient to form crystals of SSZ-65; and
(c) recovering the crystals of SSZ-65.

Accordingly, SSZ-65 may comprise the crystalline material and the SDA in combination with metallic and non-metallic oxides bonded in tetrahedral coordination through shared oxygen atoms to form a cross-linked three dimensional crystal structure. The metallic and non-metallic oxides comprise one or a combination of oxides of a first tetravalent element(s), and one or a combination of a trivalent element(s), pentavalent element(s), second tetravalent element(s) different from the first tetravalent element(s) or mixture thereof. The first tetravalent element(s) is preferably selected from the group consisting of silicon, germanium and combinations thereof. More preferably, the first tetravalent element is silicon. The trivalent element, pentavalent element and second tetravalent element (which is different from the first tetravalent element) is preferably selected from the group consisting of aluminum, gallium, iron, boron, titanium, indium, vanadium and combinations thereof. More preferably, the second trivalent or tetravalent element is aluminum or boron.

Typical sources of aluminum oxide for the reaction mixture include aluminates, alumina, aluminum colloids, aluminum oxide coated on silica sol, hydrated alumina gels such as $Al(OH)_3$ and aluminum compounds such as $AlCl_3$ and $Al_2(SO_4)_3$. Typical sources of silicon oxide include silicates, silica hydrogel, silicic acid, fumed silica, colloidal silica, tetra-alkyl orthosilicates, and silica hydroxides. Boron, as well as gallium, germanium, titanium, indium, vanadium and iron, can be added in forms corresponding to their aluminum and silicon counterparts.

A source zeolite reagent may provide a source of aluminum or boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 5,225,179, issued Jul. 6, 1993 to Nakagawa entitled "Method of Making Molecular Sieves", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The SDA may be used to provide hydroxide ion. Thus, it may be beneficial to ion exchange, for example, the halide to hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-65 are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the molecular sieve is prepared using mild stirring or agitation.

During the hydrothermal crystallization step, the SSZ-65 crystals can be allowed to nucleate spontaneously from the reaction mixture. The use of SSZ-65 crystals as seed material can be advantageous in decreasing the time necessary for complete crystallization to occur. In addition, seeding can lead to an increased purity of the product obtained by promoting the nucleation and/or formation of SSZ-65 over any undesired phases. When used as seeds, SSZ-65 crystals are added in an amount between 0.1 and 10% of the weight of first tetravalent element oxide, e.g. silica, used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-65 crystals. The drying step can be performed at atmospheric pressure or under vacuum.

SSZ-65 as prepared has a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 15; and has, after calcination, the X-ray diffraction lines of Table II below. SSZ-65 further has a composition, as synthesized (i.e., prior to removal of the SDA from the SSZ-65) and in the anhydrous state, in terms of mole ratios, shown in Table B below.

TABLE B

| As-Synthesized SSZ-65 | |
|---|---|
| $YO_2/W_cO_d$ | >15 |
| $M_{2/n}/YO_2$ | 0.01–0.03 |
| $Q/YO_2$ | 0.02–0.05 | where Y, W, c, d, M, n and Q are as defined above.

SSZ-65 can be made with a mole ratio of $YO_2/W_cO_d$ of ∞, i.e., there is essentially no $W_cO_d$ present in the SSZ-65. In this case, the SSZ-65 would be an all-silica material or a germanosilicate. Thus, in a typical case where oxides of silicon and aluminum are used, SSZ-65 can be made essentially aluminum free, i.e., having a silica to alumina mole ratio of ∞. A method of increasing the mole ratio of silica to alumina is by using standard acid leaching or chelating treatments. However, essentially aluminum-free SSZ-65 can be synthesized using essentially aluminum-free silicon sources as the main tetrahedral metal oxide component, if boron is also present. The boron can then be removed, if desired, by treating the borosilicate SSZ-65 with acetic acid at elevated temperature (as described in Jones et al., 2001, 13, 1041–1050) to produce an all-silica version of SSZ-65. SSZ-65 can also be prepared directly as a borosilicate. If desired, the boron can be removed as described above and replaced with metal atoms by techniques known in the art to make, e.g., an aluminosilicate version of SSZ-65. SSZ-65 can also be prepared directly as an aluminosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

It is believed that SSZ-65 is comprised of a new framework structure or topology which is characterized by its X-ray diffraction pattern. SSZ-65, as-synthesized, has a crystalline structure whose X-ray powder diffraction pattern exhibit the characteristic lines shown in Table I and is thereby distinguished from other molecular sieves.

TABLE I

| As-Synthesized SSZ-65 | | |
|---|---|---|
| 2 Theta[a] | d-spacing (Angstroms) | Relative Intensity (%)[b] |
| 6.94 | 12.74 | M |
| 9.18 | 9.63 | M |
| 16.00 | 5.54 | W |
| 17.48 | 5.07 | M |
| 21.02 | 4.23 | VS |
| 21.88 | 4.06 | S |
| 22.20 | 4.00 | M |
| 23.02 | 3.86 | M |
| 26.56 | 3.36 | M |
| 28.00 | 3.19 | M |

[a] ±0.1

[b] The X-ray patterns provided are based on a relative intensity scale in which the strongest line in the X-ray pattern is assigned a value of 100:W (weak) is less than 20; M(medium) is between 20 and 40; S(strong) is between 40 and 60; VS(very strong) is greater than 60.

Table IA below shows the X-ray powder diffraction lines for as-synthesized SSZ-65 including actual relative intensities.

TABLE IA

| 2 Theta[a] | d-spacing (Angstroms) | Relative Intensity (%) |
|---|---|---|
| 6.94 | 12.74 | 26.7 |
| 9.18 | 9.63 | 22.7 |
| 16.00 | 5.54 | 14.2 |
| 17.48 | 5.07 | 25.8 |
| 21.02 | 4.23 | 100.0 |
| 21.88 | 4.06 | 47.8 |
| 22.20 | 4.00 | 27.0 |
| 23.02 | 3.86 | 36.8 |
| 26.56 | 3.36 | 21.9 |
| 28.00 | 3.19 | 27.0 |

[a] ±0.1

After calcination, the SSZ-65 molecular sieves have a crystalline structure whose X-ray powder diffraction pattern include the characteristic lines shown in Table II:

TABLE II

| Calcined SSZ-65 | | |
|---|---|---|
| 2 Theta[a] | d-spacing (Angstroms) | Relative Intensity (%) |
| 6.08 | 14.54 | M |
| 6.98 | 12.66 | VS |
| 9.28 | 9.53 | S |
| 17.58 | 5.04 | M |
| 21.14 | 4.20 | VS |
| 21.98 | 4.04 | S |
| 22.26 | 3.99 | M |
| 23.14 | 3.84 | M |
| 26.68 | 3.34 | M |
| 28.10 | 3.18 | M |

[a] ±0.1

Table IIA below shows the X-ray powder diffraction lines for calcined SSZ-65 including actual relative intensities.

TABLE IIA

| 2 Theta[a] | d-spacing (Angstroms) | Relative Intensity (%) |
|---|---|---|
| 6.08 | 14.54 | 37.7 |
| 6.98 | 12.66 | 82.8 |
| 9.28 | 9.53 | 50.7 |
| 17.58 | 5.04 | 28.2 |
| 21.14 | 4.20 | 100.0 |
| 21.98 | 4.04 | 47.8 |
| 22.26 | 3.99 | 19.6 |
| 23.14 | 3.84 | 28.3 |
| 26.68 | 3.34 | 20.4 |
| 28.10 | 3.18 | 26.8 |

[a] ±0.1

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.1 degrees.

The X-ray diffraction pattern of Table I is representative of "as-synthesized" or "as-made" SSZ-65 molecular sieves. Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-65 are shown in Table II. Calcination can also result in changes in the intensities of the peaks as compared to patterns of the "as-made" material, as well as minor shifts in the diffraction pattern. The molecular sieve produced by exchanging the metal or other cations present in the molecular sieve with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-65 can be used as-synthesized, but preferably will be thermally treated (calcined). Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

The molecular sieve can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired.

Metals may also be introduced into the molecular sieve by replacing some of the cations in the molecular sieve with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-65. The SSZ-65 can also be impregnated with the metals, or the metals can be physically and intimately admixed with the SSZ-65 using standard methods known to the art.

Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the molecular sieve is typically washed with water and dried at temperatures ranging from 65° C. to about 200° C. After washing, the molecular sieve can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-65, the spatial arrangement of the atoms which form the basic crystal lattice of the molecular sieve remains essentially unchanged.

SSZ-65 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-65 can be extruded before drying, or, dried or partially dried and then extruded.

SSZ-65 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-65 is useful in catalysts for a variety of hydrocarbon conversion reactions such as hydrocracking, dewaxing, isomerization and the like.

EXAMPLES

The following examples demonstrate but do not limit the present invention.

Example 1

Synthesis of SDA 1-[1-(4-chlorophenyl)-cyclopropylmethyl]-1-ethyl-pyrrolidinium Cation

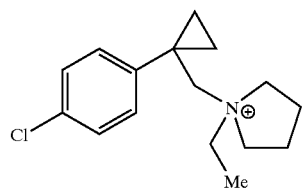

1-[1-(4-Chloro-phenyl)-cyclopropylmethyl]-1-ethyl-pyrrolidinium

The structure directing agent is synthesized according to the synthetic scheme shown below (Scheme 1).

1-[1-(4-chloro-phenyl)-cyclopropylmethyl]-1-ethyl-pyrrolidinium iodide is prepared from the reaction of the parent amine 1-[1-(4-chloro-phenyl)-cyclopropylmethyl]-pyrrolidine with ethyl iodide. A 100 gm (0.42 mole) of the amine, 1-[1-(4-chloro-phenyl)-cyclopropylmethyl]-pyrrolidine, is dissolved in 1000 ml anhydrous methanol in a 3-liter 3-necked reaction flask (equipped with a mechanical stirrer and a reflux condenser). To this solution, 98 gm (0.62 mole) of ethyl iodide is added, and the mixture is stirred at room temperature for 72 hours. Then, 39 gm (0.25 mol.) of ethyl iodide is added and the mixture is heated at reflux for 3 hours. The reaction mixture is cooled down and excess ethyl iodide and the solvent are removed at reduced pressure on a rotary evaporator. The obtained dark tan-colored solids (162 gm) are further purified by dissolving in acetone (500 ml) followed by precipitation by adding diethyl ether. Filtration and air-drying the obtained solids gives 153 gm (93% yield) of the desired 1-[1-(4-chloro-phenyl)-cyclopropylmethyl]-1-ethyl-pyrrolidinium iodide as a white powder. The product is pure by $^1$H and $^{13}$C-NMR analysis.

The hydroxide form of 1-[1-(4-chloro-phenyl)-cyclopropylmethyl]-1-ethyl-pyrrolidinium cation is obtained by an ion exchange treatment of the iodide salt with Ion-Exchange Resin-OH (BIO RAD® AH1-X8). In a 1-liter volume plastic bottle, 100 gm (255 mmol) of 1-[1-(4-chloro-phenyl)-cyclopropylmethyl]-1-ethyl-pyrrolidinium iodide is dissolved in 300 ml de-ionized water. Then, 320 gm of the ion exchange resin is added and the solution is allowed to gently stir overnight. The mixture is then filtered, and the resin cake is rinsed with minimal amount of de-ionized water. The filtrate is analyzed for hydroxide concentration by titration analysis on a small sample of the solution with 0.1N HCl. The reaction yields 96% of (245 mmol) of the desired 1-[1-(4-chloro-phenyl)-cyclopropylmethyl]-1-ethyl-pyrrolidinium hydroxide (hydroxide concentration of 0.6 M).

The parent amine 1-[1-(4-chloro-phenyl)-cyclopropylmethyl]-pyrrolidine is obtained from the LiAlH$_4$-reduction of the precursor amide [1-(4chloro-phenyl)-cyclopropyl]-pyrrolidin-1-yl-methanone. In a 3-neck 3-liter reaction flask equipped with a mechanical stirrer and reflux condenser, 45.5 gm (1.2 mol.) of LiAlH$_4$ is suspended in 750 ml anhydrous tetrahydrofuran (THF). The suspension is cooled down to 0° C. (ice-bath), and 120 gm (0.48 mole) of [1-(4-chloro-phenyl)-cyclopropyl]-pyrrolidin-1-yl-methanone dissolved in 250 ml THF is added (to the suspension) drop-wise via an addition funnel. Once all the amide solution is added, the ice-bath is replaced with a heating mantle and the reaction mixture is heated at reflux overnight. Then, the reaction solution is cooled down to 0° C. (the heating mantle was replaced with an ice-bath), and the mixture is diluted with 500 ml diethyl ether. The reaction is worked up by adding 160 ml of 15% wt. of an aqueous NaOH solution drop-wise (via an addition funnel) with vigorous stirring. The starting gray reaction solution changes to a colorless liquid with a white powdery precipitate. The solution mixture is filtered and the filtrate is dried over anhydrous magnesium sulfate. Filtration and concentration of the filtrate gives 106 gm (94% yield) of the desired amine 1-[1-(4-chloro-phenyl)-cyclopropylmethyl]-pyrrolidine as a pale yellow oily substance. The amine is pure as indicated by the clean $^1$H and $^{13}$C-NMR spectral analysis.

The parent amide [1-(4-chloro-phenyl)-cyclopropyl]-pyrrolidin-1-yl-methanone is prepared by reacting pyrrolidine with 1-(4-chloro-phenyl)-cyclopropanecarbonyl chloride. A 2-Liter reaction flask equipped with a mechanical stirrer is charged with 1000 ml of dry benzene, 53.5 gm (0.75 mol.) of pyrrolidine and 76 gm (0.75 mol.) of triethyl amine. To this mixture (at 0° C.), 108 1-(4-chloro-phenyl)-cyclopropanecarbonyl chloride gm (0.502 mol.) of (dissolved 100 ml benzene) is added drop-wise (via an addition funnel). Once the addition is completed, the resulting mixture is allowed to stir at room temperature overnight. The reaction mixture (a biphasic mixture: liquid and tan-colored precipitate) is concentrated on a rotary evaporator at reduced pressure to strip off excess pyrrolidine and the solvent (usually hexane or benzene). The remaining residue is diluted with 750 ml water and extracted with 750 ml chloroform in a separatory funnel. The organic layer is washed twice with 500 ml water and once with brine. Then, the organic layer is dried over anhydrous sodium sulfate, filtered and concentrated on a rotary evaporator at reduced pressure to give 122 gm (0.49 mol, 97% yield) of the amide as a tan-colored solid substance.

The 1-(4-chloro-phenyl)-cyclopropanecarbonyl chloride used in the synthesis of the amide is synthesized by treatment of the parent acid 1-(4-chloro-phenyl)-cyclopropanecarboxylic acid with thionyl chloride (SOCl$_2$) as described below. To 200 gms of thionyl chloride and 200 ml dichloromethane in a 3-necked reaction flask, equipped with a mechanical stirrer and a reflux condenser, 100 gm (0.51 mol.) of the 1-(4-chloro-phenyl)-cyclopropanecarboxylic acid is added in small increments (5 gm at a time) over 15 minutes period. Once all the acid is added, the reaction mixture is then heated at reflux. The reaction vessel is equipped with a trap (filled with water) to collect and trap the acidic gaseous byproducts, and used in monitoring the reaction. The reaction is usually done once the evolution of the gaseous byproducts is ceased. The reaction mixture is then cooled down and concentrated on a rotary evaporator at reduced pressure to remove excess thionyl chloride and dichloromethane. The reaction yields 109 gm (98%) of the desired 1-(4-chloro-phenyl)-cyclopropanecarbonyl chloride as reddish viscous oil.

Scheme 1

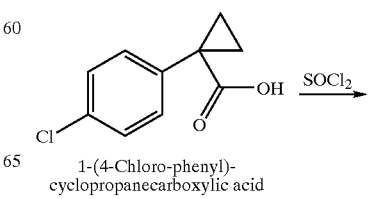

1-(4-Chloro-phenyl)-cyclopropanecarboxylic acid

-continued

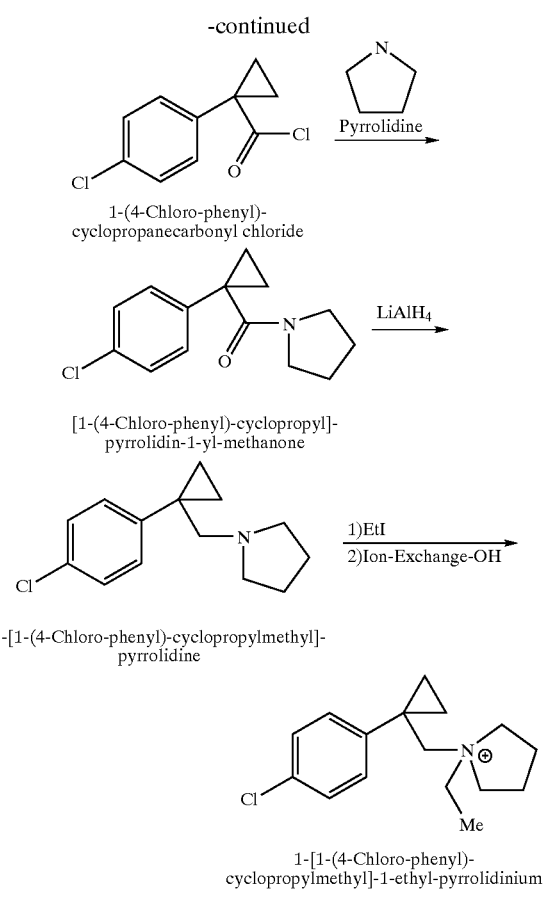

Example 2

Synthesis of SDA 1-ethyl-1-(1-phenyl-cyclopropyl-methyl)-pyrrolidinium cation

SDA 1-ethyl-1-(1-phenyl-cyclopropylmethyl)-pyrrolidinium cation is synthesized using the synthesis procedure of Example 1, except that the synthesis starts from 1-phenyl-cyclopropanecarbonyl chloride and pyrrolidine.

Example 3

Synthesis of SSZ-65

A 23 cc Teflon liner is charged with 5.4 gm of 0.6M aqueous solution of 1-ethyl-1-(1-phenyl-cyclopropylmethyl)-pyrrolidinium hydroxide (3 mmol SDA), 1.2 gm of 1M aqueous solution of NaOH (1.2 mmol NaOH) and 5.4 gm of de-ionized water. To this mixture, 0.06 gm of sodium borate decahydrate (0.157 mmol of $Na_2B_4O_7.10H_2O$; ~0.315 mmol $B_2O_3$) is added and stirred until completely dissolved. Then, 0.9 gm of CAB-O-SIL® M-5 fumed silica (~14.7 mmol $SiO_2$) is added to the solution and the mixture is thoroughly stirred. The resulting gel is capped off and placed in a Parr bomb steel reactor and heated in an oven at 160° C. while rotating at 43 rpm. The reaction is monitored by checking the gel's pH, and by looking for crystal formation using Scanning Electron Microscopy (SEM). The reaction is usually complete after heating 9–12 days at the conditions described above. Once the crystallization is completed, the starting reaction gel turns to a mixture comprised of a clear liquid and powdery precipitate. The mixture is filtered through a fritted-glass funnel. The collected solids are thoroughly washed with water and, then, rinsed with acetone (10 ml) to remove any organic residues. The solids are allowed to air-dry overnight and, then, dried in an oven at 120° C. for 1 hour. The reaction affords 0.85 gram of a very fine powder. SEM shows the presence of only one crystalline phase. The as-synthesized product is determined by powder XRD data analysis to be SSZ-65 and has the following XRD lines:

| 2 Theta[a] | d-spacing (Angstroms) | Relative Intensity (%) |
|---|---|---|
| 5.98 | 14.78 | 10.1 |
| 6.94 | 12.74 | 26.7 |
| 9.18 | 9.63 | 22.7 |
| 10.44 | 8.47 | 9.4 |
| 12.10 | 7.32 | 9.6 |
| 12.56 | 7.05 | 8.3 |
| 16.00 | 5.54 | 14.2 |
| 17.48 | 5.07 | 25.8 |
| 18.14 | 4.89 | 6.3 |
| 21.02 | 4.23 | 100.0 |
| 21.88 | 4.06 | 47.8 |
| 22.20 | 4.00 | 27.0 |
| 23.02 | 3.86 | 36.8 |
| 23.54 | 3.78 | 8.7 |
| 24.34 | 3.66 | 14.9 |
| 26.06 | 3.42 | 9.9 |
| 26.56 | 3.36 | 21.9 |
| 27.52 | 3.24 | 6.6 |
| 28.00 | 3.19 | 27.0 |
| 28.88 | 3.09 | 8.2 |
| 30.12 | 2.97 | 5.2 |
| 30.54 | 2.93 | 8.7 |
| 31.42 | 2.85 | 15.1 |

Example 4

Seeded Synthesis of Borosilicate SSZ-65

The synthesis of borosilicate SSZ-65 (B-SSZ-65) described in Example 3 above is repeated with the exception of adding 0.04 gm of SSZ-65 as seeds to speed up the crystallization process. The reaction conditions are exactly the same as for the previous example. The crystallization is complete in four days and affords 0.9 gm of B-SSZ-65.

Example 5

Synthesis of Aluminosilicate SSZ-65

A 23 cc Teflon liner is charged with 4 gm of 0.6M aqueous solution of 1-ethyl-1-(1-phenyl-cyclopropylmethyl)-pyrrolidinium hydroxide (2.25 mmol SDA), 1.5 gm of 1M aqueous solution of NaOH (1.5 mmol NaOH) and 2 gm of de-ionized water. To this mixture, 0.25 gm of Na-Y zeolite (Union Carbide's LZY-52; $SiO_2/Al_2O_3$=5) is added and stirred until completely dissolved. Then, 0.85 gm of CAB-O-SIL® M-5 fumed silica (~14. mmol $SiO_2$) is added to the solution and the mixture is thoroughly stirred. The resulting gel is capped off and placed in a Parr bomb steel reactor and heated in an oven at 160° C. while rotating at 43 rpm. The reaction is monitored by checking the gel's pH (increase in the pH usually results from condensation of the silicate species during crystallization, and decrease in pH often indicates decomposition of the SDA), and by checking for crystal formation by scanning electron microscopy. The reaction is usually complete after heating for 12 days at the conditions described above. Once the crystallization is completed, the starting reaction gel turns to a mixture comprised of a liquid and powdery precipitate. The mixture is filtered through a fritted-glass funnel. The collected solids are thoroughly washed with water and, then, rinsed with acetone (10 ml) to remove any organic residues. The solids are allowed to air-dry overnight and, then, dried in an oven at 120° C. for 1 hour. The reaction affords 0.8 gram of SSZ-65.

Examples 6–15

Syntheses of SSZ-65 at Varying $SiO_2/B_2O_3$ Ratios

SSZ-65 is synthesized at varying $SiO_2/B_2O_3$ mole ratios in the starting synthesis gel. This is accomplished using the synthetic conditions described in Example 3 keeping everything the same while changing the $SiO_2/B_2O_3$ mole ratios in the starting gel. This is done by keeping the amount of CAB-O-SIL® M-5 (98% $SiO_2$ and 2% $H_2O$) the same while varying the amount of sodium borate in each synthesis. Consequently, varying the amount of sodium borate leads to varying the $SiO_2/Na$ mole ratios in the starting gels. Table 1 below shows the results of a number of syntheses with varying $SiO_2/B_2O_3$ in the starting synthesis gel.

TABLE 1

| Example No. | $SiO_2/B_2O_3$ | $SiO_2/Na$ | Crystallization Time(days) | Products |
|---|---|---|---|---|
| 6 | 140 | 13.3 | 15 | SSZ-65 |
| 7 | 93 | 12.7 | 12 | SSZ-65 |
| 8 | 70 | 12.1 | 12 | SSZ-65 |
| 9 | 56 | 11.6 | 12 | SSZ-65 |
| 10 | 47 | 11.2 | 12 | SSZ-65 |
| 11 | 40 | 10.7 | 12 | SSZ-65 |
| 12 | 31 | 10 | 12 | SSZ-65 |
| 13 | 23 | 9 | 12 | SSZ-65 |
| 14 | 19 | 8.2 | 6 | SSZ-65 |
| 15 | 14 | 7.1 | 6 | SSZ-65 |

$^-OH/SiO_2 = 0.28$, $R^+/SiO_2 = 0.2$, $H_2O/SiO_2 = 44$
($R^+$ = organic cation (SDA))

Example 16

Calcination of SSZ-65

SSZ-65 as synthesized in Example 3 is calcined to remove the structure directing agent (SDA) as described below. A thin bed of SSZ-65 in a calcination dish is heated in a muffle furnace from room temperature to 120° C. at a rate of 1° C./minute and held for 2 hours. Then, the temperature is ramped up to 540° C. at a rate of 1° C./minute and held for 5 hours. The temperature is ramped up again at 1° C./minute to 595° C. and held there for 5 hours. A 50/50 mixture of air and nitrogen passes through the muffle furnace at a rate of 20 standard cubic feet (0.57 standard cubic meters) per minute during the calcination process. The calcined SSZ-65 has the following XRD lines:

| 2 Theta[a] | d-spacing (Angstroms) | Relative Intensity (%) |
|---|---|---|
| 6.08 | 14.54 | 37.7 |
| 6.98 | 12.66 | 82.8 |
| 9.28 | 9.53 | 50.7 |
| 10.52 | 8.41 | 16.4 |
| 12.14 | 7.29 | 14.3 |
| 12.64 | 7.00 | 6.2 |
| 14.06 | 6.30 | 5.0 |
| 15.26 | 5.81 | 8.1 |
| 16.10 | 5.50 | 17.5 |
| 17.58 | 5.04 | 28.2 |
| 18.30 | 4.85 | 5.3 |
| 21.14 | 4.20 | 100.0 |
| 21.98 | 4.04 | 47.8 |
| 22.26 | 3.99 | 19.6 |
| 23.14 | 3.84 | 28.3 |
| 23.66 | 3.76 | 7.7 |
| 24.50 | 3.63 | 13.1 |
| 26.24 | 3.40 | 8.6 |
| 26.68 | 3.34 | 20.4 |
| 28.10 | 3.18 | 26.8 |
| 28.96 | 3.08 | 7.0 |
| 30.24 | 2.96 | 5.6 |
| 30.68 | 2.91 | 9.7 |
| 31.54 | 2.84 | 14.6 |

Example 17

Conversion of Borosilicate-SSZ-65 to Aluminosilicate SSZ-65

The calcined version of borosilicate SSZ-65 (as synthesized in Example 3 and calcined in Example 16) is easily converted to the aluminosilicate SSZ-65 version by suspending borosilicate SSZ-65 in 1M solution of aluminum nitrate nonahydrate (15 ml of 1M $Al(NO_3)_3.9H_2O$ soln./1 gm SSZ-65). The suspension is heated at reflux overnight. The resulting mixture is then filtered and the collected solids are thoroughly rinsed with de-ionized water and air-dried overnight. The solids are further dried in an oven at 120° C. for 2 hours.

Example 18

Ammonium-Ion Exchange of SSZ-65

The $Na_+$ form of SSZ-65 (prepared as in Example 3 or as in Example 5 and calcined as in Example 16) is converted to $NH_4^+$-SSZ-65 form by heating the material in an aqueous solution of $NH_4NO_3$ (typically 1 gm $NH_4NO_3$/1 gm SSZ-65 in 20 ml $H_2O$) at 90° C. for 2–3 hours. The mixture is then filtered and the obtained $NH_4$-exchanged-product is washed with de-ionized water and dried. The $NH_4^+$ form of SSZ-65 can be converted to the $H^+$ form by calcination (as described in Example 16) to 540° C.

Example 19

Argon Adsorption Analysis

SSZ-65 has a micropore volume of 0.16 cc/gm based on argon adsorption isotherm at 87.5° K (−186° C.) recorded on ASAP 2010 equipment from Micromerities. The sample is first degassed at 400° C. for 16 hours prior to argon adsorption. The low-pressure dose is 6.00 cm³/g (STP). A maximum of one hour equilibration time per dose is used and the total run time is 35 hours. The argon adsorption isotherm is analyzed using the density function theory (DFT) formalism and parameters developed for activated carbon slits by Olivier (*Porous Mater.* 1995, 2, 9) using the Saito Foley adaptation of the Horvarth-Kawazoe formalism (*Microporous Materials*, 1995, 3, 531) and the conventional t-plot method (*J. Catalysis*, 1965, 4, 319).

Example 20

Constraint Index

The hydrogen form of SSZ-65 of Example 3 (after treatment according to Examples 16, 17 and 18) is pelletized at 3 KPSI, crushed and granulated to 20–40 mesh. A 0.6 gram sample of the granulated material is calcined in air at 540° C. for 4 hours and cooled in a desiccator to ensure dryness. Then, 0.5 gram is packed into a ⅜ inch stainless steel tube with alundum on both sides of the molecular sieve bed. A Lindburg furnace is used to heat the reactor tube. Helium is introduced into the reactor tube at 10 cc/min. and at atmospheric pressure. The reactor is heated to about 315° C., and a 50/50 feed of n-hexane and 3-methylpentane is introduced into the reactor at a rate of 8 μl/min. The feed is delivered by a Brownlee pump. Direct sampling into a GC begins after 10 minutes of feed introduction. The Constraint Index (CI) value is calculated from the GC data using methods known in the art. SSZ-65 has a CI of 0.67 and a conversion of 92% after 20 minutes on stream. The material fouls rapidly and at 218 minutes the CI is 0.3 and the conversion is 15.7%. The data suggests a large pore zeolite with perhaps large cavities.

Example 21

Hydrocracking of n-Hexadecane

A 1 gm sample of SSZ-65 (prepared as in Example 3 and treated as in Examples 16, 17 and 18) is suspended in 10 gm de-ionized water. To this suspension, a solution of $Pd(NH_3)_4(NO_3)_2$ at a concentration which would provide 0.5 wt. % Pd with respect to the dry weight of the molecular sieve sample is added. The pH of the solution is adjusted to pH of ~9 by a drop-wise addition of dilute ammonium hydroxide solution. The mixture is then heated in an oven at 75° C. for 48 hours. The mixture is then filtered through a glass frit, washed with de-ionized water, and air-dried. The collected Pd-SSZ-65 sample is slowly calcined up to 482° C. in air and held there for three hours.

The calcined Pd/SSZ-65 catalyst is pelletized in a Carver Press and granulated to yield particles with a 20/40 mesh size. Sized catalyst (0.5 g) is packed into a ¼ inch OD tubing reactor in a micro unit for n-hexadecane hydroconversion. The table below gives the run conditions and the products data for the hydrocracking test on n-hexadecane.

After the catalyst is tested with n-hexadecane, it is titrated using a solution of butylamine in hexane. The temperature is increased and the conversion and product data evaluated again under titrated conditions. The results shown in the table below show that SSZ-65 is effective as a hydrocracking catalyst.

| | |
|---|---|
| Temperature | 260° C. (550° F.) |
| Time-on-Stream (hrs.) | 342.4–343.4 |
| WHSV | 1.55 |
| PSIG | 1200 |
| Titrated? | Yes |

-continued

| | |
|---|---|
| n-16, % Conversion | 96.9 |
| Hydrocracking Conv. | 47.9 |
| Isomerization Selectivity, % | 50.5 |
| Cracking Selectivity, % | 49.5 |
| $C_{4-}$, % | 2.7 |
| $C_5/C_4$ | 16.9 |
| $C_{5+}C_6/C_5$, % | 16.74 |
| DMB/MP | 0.06 |
| $C_4$–$C_{13}$ i/n | 3.83 |
| $C_7$–$C_{13}$ yield | 38.35 |

Example 22

Synthesis of SSZ-65

SSZ-65 is synthesized in a manner similar to that of Example 3 using a 1-[1-(4-chlorophenyl)-cyclopropylmethyl]-1-ethyl-pyrrolidinium cation as the SDA.

What is claimed is:

1. A molecular sieve having a mole ratio greater than about 15 of (1) an oxide of a first tetravalent element to (2) an oxide of a trivalent element, pentavalent element, second tetravalent element which is different from said first tetravalent element or mixture thereof and having, after calcination, the X-ray diffraction lines of Table II.

2. A molecular sieve having a mole ratio greater than about 15 of (1) an oxide selected from the group consisting of silicon oxide, germanium oxide and mixtures thereof to (2) an oxide selected from aluminum oxide, gallium oxide, iron oxide, boron oxide, titanium oxide, indium oxide, vanadium oxide and mixtures thereof, and having, after calcination, the X-ray diffraction lines of Table II.

3. A molecular sieve according to claim 2 wherein the oxides comprise silicon oxide and aluminum oxide.

4. A molecular sieve according to claim 2 wherein the oxides comprise silicon oxide and boron oxide.

5. A molecular sieve according to claim 2 wherein the oxide comprises silicon oxide.

6. A molecular sieve according to claim 1 wherein said molecular sieve is predominantly in the hydrogen form.

7. A molecular sieve according to claim 1 wherein said molecular sieve is substantially free of acidity.

8. A molecular sieve according to claim 2 wherein said molecular sieve is predominantly in the hydrogen form.

9. A molecular sieve according to claim 2 wherein said molecular sieve is substantially free of acidity.

10. A molecular sieve having a composition, as synthesized and in the anhydrous state, in terms of mole ratios as follows:

| | |
|---|---|
| $YO_2/W_cO_d$ | >15 |
| $M_{2/n}/YO_2$ | 0.01–0.03 |
| $Q/YO_2$ | 0.02–0.05 | wherein Y is silicon, germanium or a mixture thereof; W is aluminum, gallium, iron, boron, titanium, indium, vanadium or mixtures thereof; c is 1 or 2; d is 2 when c is 1 or d is 3 or 5 when c is 2; M is an alkali metal cation, alkaline earth metal cation or mixtures thereof; n is the valence of M; and Q is a 1-[1-(4-chlorophenyl)-cyclopropylmethyl]-1-ethyl-pyrrolidinium or 1-ethyl-1-(1-phenyl-cyclopropylmethyl)-pyrrolidinium cation.

11. A molecular sieve according to claim 10 wherein W is aluminum and Y is silicon.

12. A molecular sieve according to claim 11 wherein W is boron and Y is silicon.

13. A molecular sieve according to claim 11 wherein Q is a 1-[1-(4-chlorophenyl)-cyclopropylmethyl]-1-ethyl-pyrrolidinium cation.

14. A molecular sieve according to claim 11 wherein Q is a 1-ethyl-1-(1-phenyl-cyclopropylmethyl)-pyrrolidinium cation.

15. A method of preparing a crystalline material comprising (1) an oxide of a first tetravalent element and (2) an oxide of a trivalent element, pentavalent element, second tetravalent element which is different from said first tetravalent element or mixture thereof and having mole ratio of the first oxide to the second oxide greater than 15, said method comprising contacting under crystallization conditions sources of said oxides and a structure directing agent comprising a 1-[1-(4-chlorophenyl)-cyclopropylmethyl]-1-ethyl-pyrrolidinium or 1-ethyl-1-(1-phenyl-cyclopropylmethyl)-pyrrolidium cation.

16. The method according to claim 15 wherein the first tetravalent element is selected from the group consisting of silicon, germanium and combinations thereof.

17. The method according to claim 15 wherein the trivalent element, pentavalent element or second tetravalent element is selected from the group consisting of aluminum, gallium, iron, boron, titanium, indium, vanadium and combinations thereof.

18. The method according to claim 17 wherein the trivalent element, pentavalent element or second tetravalent element is selected from the group consisting of aluminum, boron, titanium and combinations thereof.

19. The method according to claim 16 wherein the first tetravalent element is silicon.

20. The method according to claim 15 wherein the structure directing agent comprises a 1-[1-(4-chlorophenyl)-cyclopropylmethyl]-1-ethyl-pyrrolidinium cation.

21. The method according to claim 15 wherein the structure directing agent comprises a 1-ethyl-1-(1-phenyl-cyclopropylmethyl)-pyrrolidinium cation.

22. The method of claim 15 wherein the crystalline material has, after calcination, the X-ray diffraction lines of Table II.

* * * * *